(12) United States Patent
Yun et al.

(10) Patent No.: US 10,316,128 B2
(45) Date of Patent: Jun. 11, 2019

(54) MODIFIED POLYIMIDE AND CURABLE RESIN COMPOSITION

(71) Applicant: LG CHEM, LTD., Seoul (KR)

(72) Inventors: Cheolmin Yun, Daejeon (KR); Kyungjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 120 days.

(21) Appl. No.: 15/501,326

(22) PCT Filed: Jun. 28, 2016

(86) PCT No.: PCT/KR2016/006884
§ 371 (c)(1),
(2) Date: Feb. 2, 2017

(87) PCT Pub. No.: WO2017/047917
PCT Pub. Date: Mar. 23, 2017

(65) Prior Publication Data
US 2017/0226257 A1    Aug. 10, 2017

(30) Foreign Application Priority Data
Sep. 15, 2015   (KR) .................. 10-2015-0130041

(51) Int. Cl.
*C08F 290/06*   (2006.01)
*C08J 5/18*   (2006.01)
(Continued)

(52) U.S. Cl.
CPC ........ *C08F 290/065* (2013.01); *C08G 73/101* (2013.01); *C08G 73/1032* (2013.01);
(Continued)

(58) Field of Classification Search
CPC ..... C08F 290/065; C09D 7/20; C09D 151/08; C09D 179/08; C08G 73/1032; C08G 73/1039; C08G 73/101; C08J 5/18
See application file for complete search history.

(56) References Cited

U.S. PATENT DOCUMENTS 5,229,485 A   7/1993   Kramer et al.
5,397,419 A   3/1995   Furutani et al.
(Continued)

FOREIGN PATENT DOCUMENTS

CA   2052489 A    4/1992
JP   1992-261431 A   9/1992
(Continued)

OTHER PUBLICATIONS

International Search Report issued for International Patent Application No. PCT/KR2016/006884 dated Oct. 12, 2016 (3 pages).

*Primary Examiner* — John E Uselding
(74) *Attorney, Agent, or Firm* — Rothwell, Figg, Ernst & Manbeck, P.C.

(57) ABSTRACT

The present invention relates to a modified polyimide including a terminal group represented by Formula 1:

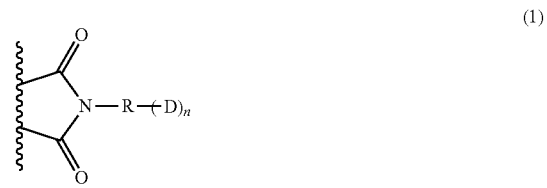

(1)

wherein D is a heat curable or photocurable functional group, R is a divalent or higher polyvalent organic
(Continued)

group, and n is an integer of 1 or greater. The modified polyimide undergoes less reduction in transmittance and is protected from discoloration when cured. Due to these advantages, the modified polyimide can provide a highly transparent colorless polyimide film. Particularly, the modified polyimide is suitable for use in display substrates, interlayer insulating films of semiconductor devices, passivation films, buffer coat films, insulating films for multilayer printed circuit boards, insulating films of OLEDs, and protective films of thin film transistors of liquid crystal display devices. The present invention also relates to a curable composition including the modified polyimide.

19 Claims, 3 Drawing Sheets

(51) Int. Cl.
  *C09D 179/08* (2006.01)
  *C08G 73/10* (2006.01)
  *C09D 7/20* (2018.01)
  *C09D 151/08* (2006.01)
(52) U.S. Cl.
  CPC ..... *C08G 73/1039* (2013.01); *C08G 73/1053* (2013.01); *C08G 73/1071* (2013.01); *C08G 73/1078* (2013.01); *C08J 5/18* (2013.01); *C09D 7/20* (2018.01); *C09D 151/08* (2013.01); *C09D 179/08* (2013.01); *C08J 2379/08* (2013.01)

(56) References Cited

U.S. PATENT DOCUMENTS

| | | | |
|---|---|---|---|
| 8,932,801 B2 | 1/2015 | Chou et al. | |
| 2008/0311303 A1 | 12/2008 | Naiki et al. | |
| 2009/0181324 A1* | 7/2009 | Chou | C08G 73/1042 430/283.1 |
| 2012/0135251 A1 | 5/2012 | Jeong et al. | |
| 2015/0344627 A1 | 12/2015 | Mizori | |

FOREIGN PATENT DOCUMENTS

| | | |
|---|---|---|
| JP | 1993-301960 A | 11/1993 |
| JP | 2010-070604 A | 4/2010 |
| JP | 2010-202543 A | 9/2010 |
| JP | 2014-172994 A | 9/2014 |
| KR | 10-2007-0050006 A | 5/2007 |
| KR | 10-2012-0057467 A | 6/2012 |
| KR | 10-2015-0095275 A | 8/2015 |
| TW | 200933291 A | 8/2009 |
| WO | 2014/081894 A1 | 5/2014 |
| WO | 2014-081894 A1 | 5/2014 |

* cited by examiner

MODIFIED POLYIMIDE AND CURABLE RESIN COMPOSITION

CROSS-REFERENCE TO RELATED APPLICATIONS

This application is a 35 U.S.C. § 371 National Phase Entry Application from PCT/KR2016/006884, filed on Jun. 28, 2016, and designating the United States, which claims priority under 35 U.S.C. § 119 to Korean Patent Application No. 10-2015-0130041, filed on Sep. 15, 2015, the entire disclosure of which is incorporated herein by reference.

BACKGROUND OF THE INVENTION

The present invention relates to a modified polyimide and a curable

1. Field of the Invention
resin composition. More specifically, the present invention relates to a curable resin composition for the production of a more colorless transparent polyimide film.

2. Description of the Related Art

Organic films have the advantages of higher bendability, less brittleness, and lighter weight than glass. With the recent trend towards flexible displays, substrates for flat panel displays have been replaced with organic films.

Transparent polymer plastics are advantageous in terms of ease of processing, mass productivity, and price. Due to these advantages, transparent polymer plastics are widely used at present as materials for cover windows and touch panels for the protection of windows of flat panel display devices.

Like films for displays, films for touch panel substrates are also optical components for better visibility of LCD and OLED screens and are thus required to have low haze and high transmittance. Further, films for touch panel substrates should be highly durable under various environmental conditions as well as against fingernails due to the frequent finger touch. For high durability, transparent polymer plastics need surface treatment with high-hardness hard coating. High surface hardness, impact resistance, and flex resistance are requirements for the manufacture of high hardness products. PET or cyclo-olefin polymer (COP) films are currently in use for touch panel substrates. However, high retardation of PET causes diffuse reflection of incident light, making screen images invisible. High deposition temperature is required to lower the resistance of ITO in touch panels. However, the deposition temperatures of some COP substrate films are difficult to increase due to their poor heat resistance. That is, there are no materials that can simultaneously meet three requirements: excellent heat resistance, optical properties, and mechanical properties for high processability.

In recent years, polymethyl methacrylate (PMMA) resin sheets have been used for outer windows of portable display devices in place of transparent glass substrates. Due to their poor impact resistance, however, PMMA resin sheets tend to be brittle even when small external impacts are applied thereto. Some transparent sheets for outer windows of potable display devices are produced by coextrusion of a PMMA resin with a polycarbonate (PC) resin. The polycarbonate (PC) resin imparts impact resistance to the transparent sheets. However, the outer windows are pushed back when pushed down with a finger because of relatively low flexural modulus of the sheets.

On the other hand, cyclo-olefin polymer (COP) films exhibit excellent characteristics in terms of transparency, hygroscopicity, etc., but they have relatively low flexibility, heat resistance, and surface hardness. Particularly, relatively low surface hardness of cyclo-olefin polymer (COP) films leads to low scratch resistance. That is, cyclo-olefin polymer (COP) films are not sufficiently protected from scratches.

In attempts to solve such problems, many methods have been developed for producing flexible films in which transparent resin layers with good heat resistance and high strength are laminated. However, the lamination of multiple resin layers is inefficient in terms of processing and problems may arise from poor adhesion between the resin layers.

Some processes, such as evaporation deposition and sputtering, are essential for the production of transparent electrodes. Since such processes are carried out at high temperatures of at least 200° C., heat resistance of flexible substrates is considered an important factor in the production of transparent electrodes. Fillers may be added to maintain the basic mechanical properties (e.g., heat resistance) of flexible substrates. In this case, however, voids may be formed on the surface of substrates, resulting in poor hygroscopicity. Particularly, high dielectric constant fillers are used to improve the heat resistance of substrates but may deteriorate the adhesion of substrates to copper foils. When polymeric materials containing fillers are used for substrates, the substrate materials lose their flexibility, tending to be brittle. A method for improving the strength, heat resistance, and adhesiveness of a substrate is known in which a glass fiber is used to make a polymeric material into a prepreg. However, this method is difficult to use in applications where high dielectric constant is needed because the polymeric material loses its dielectric constant.

Hard coating agents are coated on substrates, dried, and UV cured to form hard coatings. Such hard coating agents include a polyfunctional acrylic oligomer, a polyfunctional acrylic monomer, a photoinitiator, and a solvent. However, most hard coating agents suffer from the disadvantages of poor flex resistance and impact resistance when it is intended to increase the crosslinking density of coatings for better hardness. The use of high molecular weight acrylic oligomers or flexible acrylate oligomers and monomers including ethylene oxide in their molecules contributes to improvements in the flex resistance and impact resistance of substrates but leads to low hardness.

Particularly, fluorine compounds and silicon compounds are mainly used to improve the scratch resistance and fouling resistance of films. Fluorine-containing polymers with low refractive index and fluorine-containing olefin copolymers exhibit extremely high water and oil repellency and expose —$CF_2$— or —$CF_3$ groups at the surface of films to ensure good antifouling properties, but are not readily formed into films by coating because they are hardly soluble in solvents. These polymers and copolymers are very expensive and undergo drastic changes in physical properties depending on molding conditions.

In addition to good heat resistance, polyimide resins have outstanding mechanical properties, including mechanical strength, wear resistance, dimensional stability, and chemical resistance, and excellent electrical properties, including insulation performance. Due to these advantages, polyimide resins are used in a wide range of industrial applications, including electrical and electronic applications.

Polyimides are widely used as highly heat resistant advanced materials, such as automotive materials and aeronautical materials, and in the field of electronic devices, such as interlayer insulating films for semiconductors, buffer coats, substrates for flexible printed circuit boards, liquid crystal alignment layers, and electrical insulating materials, because of their excellent mechanical properties, heat resistance, chemical resistance, and electrical insulation properties.

However, general polyimide resins have high transmittance in the visible region owing to their high density aromatic cyclic structure and are colored yellowish owing to their very low transmittance, particularly at wavelengths of around 400 nm, limiting their use in applications where transparency is required.

Colorless transparent polyimide resins can be used as raw materials for the production of highly heat resistant transparent coatings and films in the field of electronic devices, for example, materials for electrode insulating films and transparent protective films in the field of liquid crystal displays, hard coating films of touch panels, and hard coating films and transparent films in transparent flexible substrates.

Under these circumstances, continued efforts have been made to develop polyimides that can exhibit better chemical resistance and storage stability, sufficient mechanical properties, and excellent high temperature stability.

SUMMARY OF THE INVENTION

One object of the present invention is to provide a modified polyimide including curable functional groups.

A further object of the present invention is to provide a curable resin composition including the modified polyimide.

Another object of the present invention is to provide a modified polyimide film produced using the curable resin composition.

Still another object of the present invention is to provide a method for preparing the modified polyimide.

One aspect of the present invention provides a modified polyimide including a terminal group represented by Formula 1:

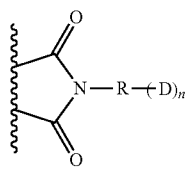

(1)

wherein D is a heat curable or photocurable functional group, R is a divalent or higher polyvalent organic group, and n is an integer of 1 or greater.

The terminal group of Formula 1 may be derived from the reaction of a terminal acid dianhydride group of a polyimide and a compound of Formula 2:

(2)

wherein R, D, and n are as defined in Formula 1.

The modified polyimide may be represented by Formula 4:

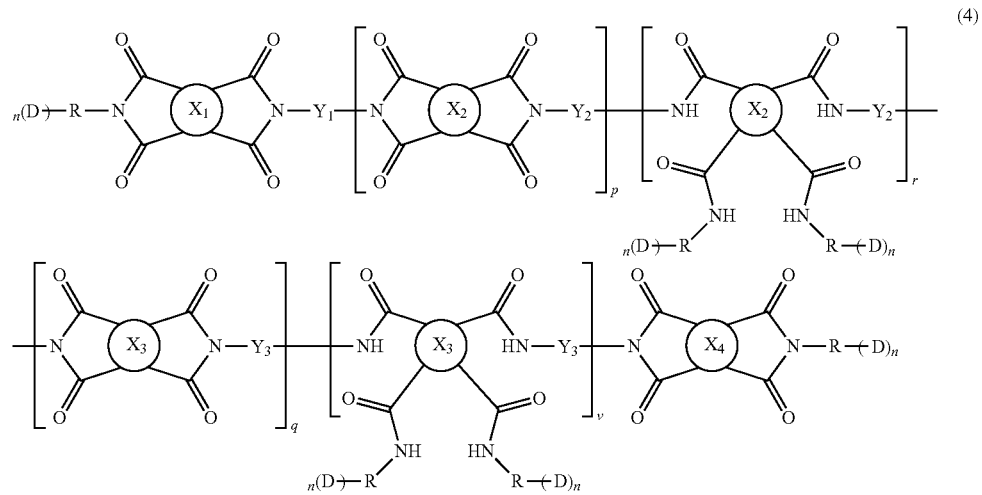

(4)

wherein D, R, and n are as defined above, $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, and p, q, r, and v are each independently an integer of 0 or greater, with the proviso that p, q, r, and v are not simultaneously 0.

The modified polyimide may further include, in its main chain, one or more repeating structures represented by Formulae 5a to 5c:

(5a)

wherein $R_a$ and $R_b$ are each independently selected from the group consisting of aromatic, alicyclic, and aliphatic divalent organic groups,

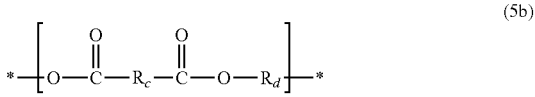

(5b)

wherein $R_c$ and $R_d$ are each independently selected from the group consisting of aromatic, alicyclic, and aliphatic divalent organic groups, and

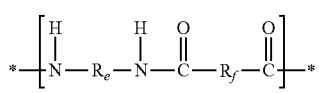

(5c)

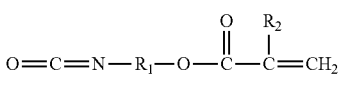

(2a)

wherein $R_e$ and $R_f$ are each independently selected from the group consisting of aromatic, alicyclic, and aliphatic divalent organic groups.

D in Formula 1 may be selected from the group consisting of vinyl, alkyne, acrylate, carboxyl, amide, amino, epoxy, isocyanate, cyano, acid anhydride, mercapto, silanol, alkoxysilane, hydroxyl, oxazoline groups, and combinations thereof. More specifically, D in Formula 1 may be selected from acrylate, epoxy, isocyanate, and mercapto groups.

In Formula 4, $X_1$, $X_2$, $X_3$, and $X_4$ may be each independently a tetravalent organic group derived from an aromatic tetracarboxylic dianhydride and $Y_1$, $Y_2$, and $Y_3$ may be each independently a divalent organic group derived from an aromatic diamine.

The modified polyimide of Formula 4 may be prepared by reacting a polyimide compound having terminal acid dianhydride groups, represented by Formula 3:

wherein $R_1$ is a $C_1$-$C_{18}$ alkylene group, an arylene group or a divalent organic group interrupted by at least one ether, ester, urethane, amide, siloxane or silazane bond, in which at least one hydrogen atom is optionally substituted with a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof, and $R_2$ is a hydrogen atom or a $C_1$-$C_{18}$ alkyl group.

The polyimide of Formula 3 may be prepared by reacting the tetracarboxylic dianhydride with the diamine in a molar ratio of 1:1 to 1.8:1.

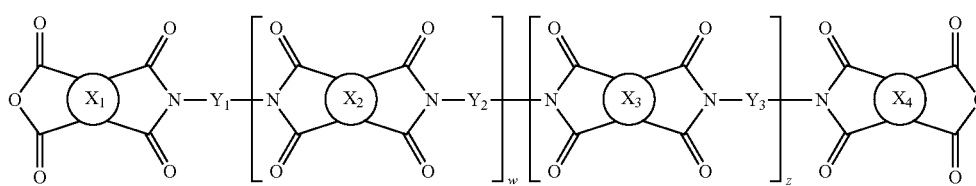

(3)

wherein $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, and w and z are each independently an integer of 1 or greater, with an isocyanate compound represented by Formula 2:

(2)

wherein D is a heat curable or photocurable functional group, R is a divalent or higher polyvalent organic group, n is an integer of 1 or greater.

The modified polyimide may have a number average molecular weight of 500 to 80,000 g/mol.

In Formula 4, the sum of p+q+r+v may be an integer from 5 to 100.

The ratio of the weight average molecular weight to the number average molecular weight of the modified polyimide may be 1 or greater.

The isocyanate compound of Formula 2 may be a compound represented by Formula 2a:

A further aspect of the present invention provides a curable resin composition including the modified polyimide, a thermal polymerization or photopolymerization initiator, and a solvent.

The solvent may be selected from N,N-diethylacetamide (DEAc), N,N-diethylformamide (DEF), N-ethylpyrrolidone, and mixtures thereof.

The curable resin composition may further include a polymerizable compound having an ethylenically unsaturated bond, a urethane (meth)acrylate compound or a mixture thereof.

Another aspect of the present invention provides a polyimide film produced using the curable resin composition.

According to one embodiment, the polyimide film may have a yellowness index (YI) of 7 or less, as measured at a thickness of 10 μm or more.

Yet another aspect of the present invention provides a method for preparing a modified polyimide having terminal curable functional groups, represented by Formula 4:

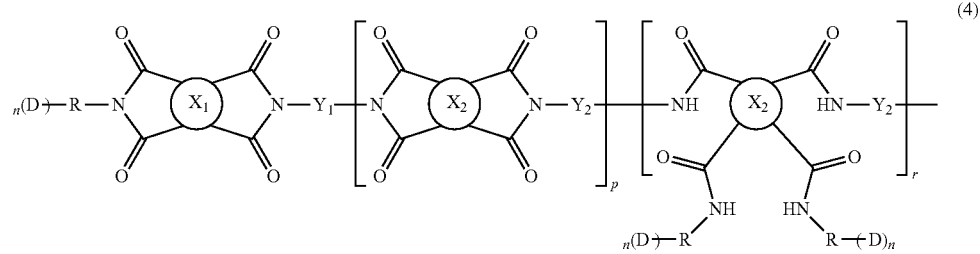

(4)

-continued

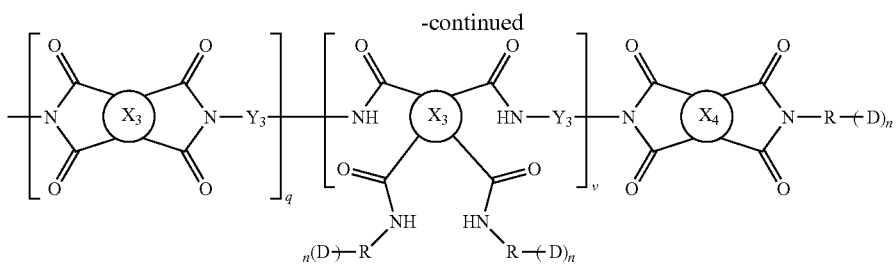

wherein $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, p, q, r, and v are each independently an integer of 0 or greater, with the proviso that p, q, r, and v are not simultaneously 0, D is a heat curable or photocurable functional group, R is a divalent or higher polyvalent organic group, and n is an integer of 1 or greater, the method including reacting the tetracarboxylic dianhydride with the diamine in a polymerization solvent to prepare a polyamic acid, imidizing the polyamic acid to prepare a polyimide having terminal acid dianhydride groups, represented by Formula 3:

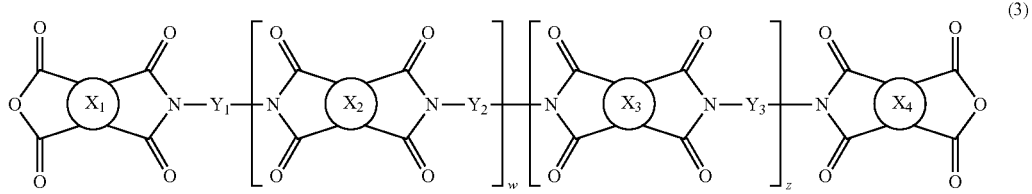

wherein $X_1$, $X_2$, $X_3$, $X_4$, $Y_1$, $Y_2$, and $Y_3$ are as defined above and w and z are each independently an integer of 1 or greater, and reacting the polyimide of Formula 3 with a compound represented by Formula 2:

 (2)

wherein D, R, and n are as defined above.

According to one embodiment, the polymerization solvent may be selected from methyl ethyl ketone, cyclohexanone, toluene, xylene, tetramethylbenzene, ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, triethylene glycol monoethyl ether, ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N,N-dimethylacetamide (DMAc), N-methylpyrrolidone (NMP), N-ethylpyrrolidone (NEP), 1,3-dimethyl-2-imidazolidinone, N, N-dimethylmethoxyacetamide, dimethyl sulfoxide, pyridine, dimethyl sulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, and mixtures thereof.

Details of other embodiments of the present invention are included in the detailed description that follows.

The modified polyimide of the present invention has terminal heat curable or photocurable functional groups in the main chain. This structure allows faster curing of a curable resin composition including the modified polyimide and enables the production of a more colorless transparent polyimide film.

DETAILED DESCRIPTION OF THE INVENTION

Figure 1:
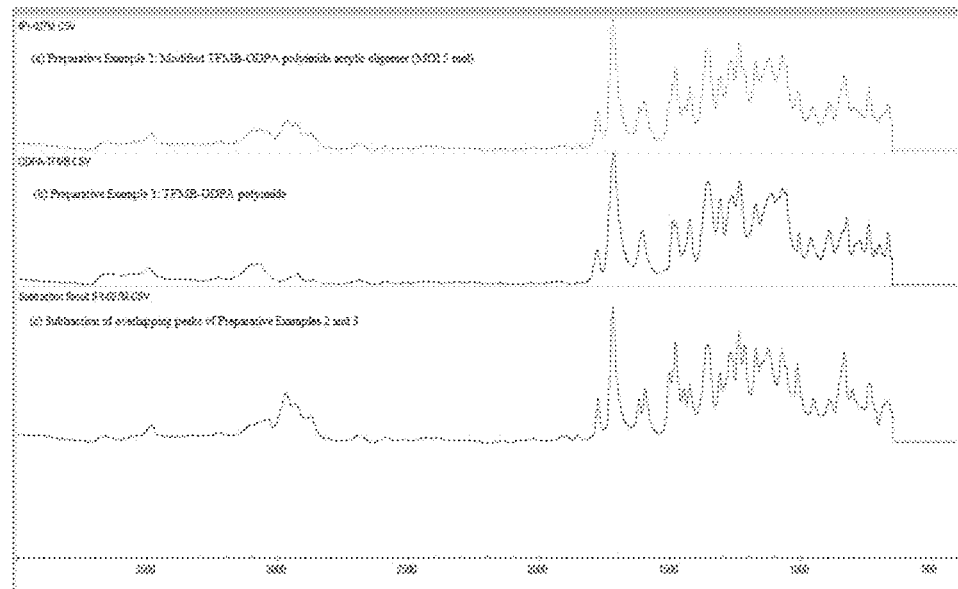
FIG. 1 shows attenuated total reflectance (ATR) spectra of polyimides prepared in Preparative Examples 2 and 3.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, detailed explanations of related art are omitted when it is deemed that they may unnecessarily obscure the essence of the present invention.

Unless otherwise stated, all compounds or functional groups may be substituted or unsubstituted. The term "substituted" used herein means that at least one of the hydrogen atoms contained in the compounds or functional groups is replaced by a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof.

Unless otherwise mentioned, the term "combination thereof" means that two or more functional groups are bonded to each other via a linking group, such as a single bond, a double bond, a triple bond, a $C_1$-$C_{10}$ alkylene group (e.g., a methylene (—$CH_2$—) or ethylene (—$CH_2CH_2$—) group), a $C_1$-$C_{10}$ fluoroalkylene group (e.g., a fluoromethylene (—$CF_2$—) or perfluoroethylene (—$CF_2CF_2$—) group), a heteroatom, such as N, O, P, S or Si, or a functional group containing the heteroatom (specifically, a heteroalkylene group containing a carbonyl (—C=O—) group, an ether (—O—) group, an ester (—COO—) group, —S—, —NH— or —N=N— in the molecule), or two or more functional groups are fused together.

The present invention provides a modified polyimide including a terminal group represented by Formula 1:

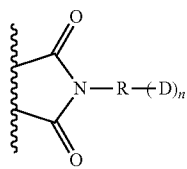

(1)

wherein D is a heat curable or photocurable functional group, R is a divalent or higher polyvalent organic group, and n is an integer of 1 or greater.

The present invention also provides a curable resin composition including the modified polyimide.

The present invention also provides a polyimide film produced using the curable resin composition.

The present invention also provides a method for preparing the modified polyimide.

The functional group of Formula 1 may be a heat curable or photocurable functional group derived from the reaction of a terminal acid dianhydride group of a polyimide and a compound of Formula 2:

O=C=N—R—[D]$_n$ (2)

wherein R, D, and n are as defined in Formula 1.

The heat curable or photocurable functional group D may be selected from the group consisting of vinyl, alkyne, acrylate, carboxyl, amide, amino, epoxy, isocyanate, cyano, acid anhydride, mercapto, silanol, alkoxysilane, hydroxyl, oxazoline groups, and combinations thereof. Preferably, D is selected from acrylate, epoxy, isocyanate, and mercapto groups. More preferably, D is an acrylate group.

More specifically, the compound of Formula 2 may be selected from compounds represented by Formulae 2a to 2c:

(2a)

wherein $R_1$ is a $C_1$-$C_{18}$ alkylene group, a $C_6$-$C_{24}$ arylene group or a divalent organic group interrupted by at least one ether, ester, urethane, amide, siloxane or silazane bond, in which at least one hydrogen atom is optionally substituted with a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof, preferably a halogen atom, a $C_1$-$C_{10}$ alkyl group or a halogenated alkyl group, and $R_2$ is a hydrogen atom or a $C_1$-$C_{18}$ alkyl group,

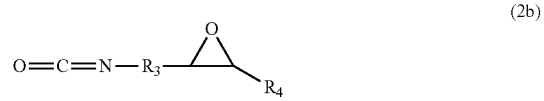

(2b)

wherein $R_3$ is a $C_1$-$C_{18}$ alkylene group, a $C_6$-$C_{24}$ arylene group or a divalent organic group interrupted by at least one ether, ester, urethane, amide, siloxane or silazane bond, in which at least one hydrogen atom is optionally substituted with a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof, preferably a halogen atom, a $C_1$-$C_{10}$ alkyl group or a halogenated alkyl group, and $R_4$ is a hydrogen atom or a $C_1$-$C_{18}$ alkyl group, and O=C=N—R$_5$—SH (2c)

wherein $R_5$ is a $C_1$-$C_{18}$ alkylene group, a $C_6$-$C_{24}$ arylene group or a divalent organic group interrupted by at least one ether, ester, urethane, amide, siloxane or silazane bond, in which at least one hydrogen atom is optionally substituted with a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof, preferably a halogen atom, a $C_1$-$C_{10}$ alkyl group or a halogenated alkyl group.

Preferred is the compound of Formula 2a modified with an acryloyl group and an isocyanate group.

The present invention provides a method for preparing a modified polyimide having terminal curable functional groups, represented by Formula 4:

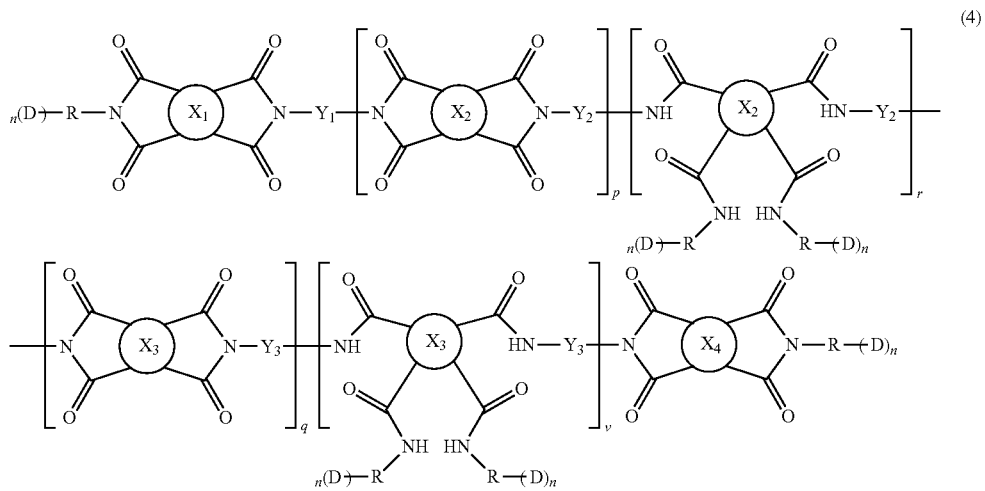

(4)

wherein D is a heat curable or photocurable functional group, R is a divalent or higher polyvalent organic group, n is an integer of 1 or greater, $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, and p, q, r, and v are each independently an integer of 0 or greater, with the proviso that p, q, r, and v are not simultaneously 0, the method including reacting the tetracarboxylic dianhydride with the diamine in a polymerization solvent to prepare a polyamic acid, imidizing the polyamic acid to prepare a polyimide having terminal acid dianhydride groups, represented by Formula 3:

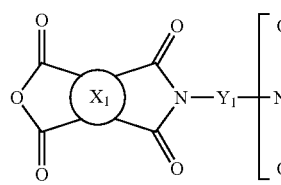

(3)

wherein $X_1$, $X_2$, $X_3$, $X_4$, $Y_1$, $Y_2$, and $Y_3$ are as defined above and w and z are each independently an integer of 1 or greater, with the proviso that the sum of w+z is greater than or equal to the sum of p+q+r+v, and reacting the polyimide of Formula 3 with a compound represented by Formula 2:

 (2)

wherein D, R, and n are as defined above.

In Formula 4, the sum of p+q+r+v may be an integer from 2 to 100.

According to the method of the present invention, the isocyanate group of the compound of Formula 2 reacts with the terminal dianhydride groups of the polyimide and the imide groups present in the main chain of the polyimide to ring open the imide groups. As a result, the organic group having the terminal curable functional group is bonded to the side chains of the ring-opened polyimide.

The polyimide of the present invention may further include, in its main chain, one or more repeating structures represented by Formulae 5a to 5c:

 (5a)

wherein $R_a$ and $R_b$ are each independently selected from the group consisting of aromatic, alicyclic, and aliphatic divalent organic groups,

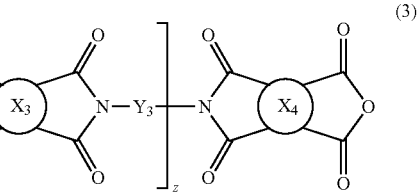 (5b)

wherein $R_c$ and $R_d$ are each independently selected from the group consisting of aromatic, alicyclic, and aliphatic divalent organic groups, and

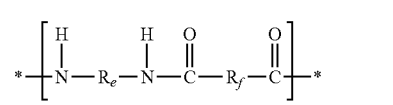 (5c)

wherein $R_e$ and $R_f$ are each independently selected from the group consisting of aromatic, alicyclic, and aliphatic divalent organic groups.

Specifically, $R_a$, $R_b$, $R_c$, $R_d$, $R_e$, and $R_f$ in Formulae 5a to 5c may be divalent aromatic organic groups represented by Formulae 9a to 9d. More specifically, $R_a$, $R_b$, $R_c$, $R_d$, $R_e$, and $R_f$ in Formulae 5a to 5c may be divalent aromatic organic groups represented by Formulae 10a to 10q. Formulae 9a to 9d and 10a to 10q are provided below.

$X_1$, $X_2$, $X_3$, and $X_4$ in Formula 4 may be each independently a tetravalent organic group derived from a dianhydride. More preferably, $X_1$, $X_2$, $X_3$, and $X_4$ in Formula 4 is each independently derived from a tetracarboxylic dianhydride including a tetravalent aromatic organic group.

Tetracarboxylic dianhydrides suitable for use in the preparation of the polyimide of Formula 3 may be those including the functional groups $X_1$, $X_2$, $X_3$, and $X_4$ in Formula 3 and may be, for example, those including a tetravalent organic group in which monocyclic aromatic groups, polycyclic aromatic groups or combinations thereof are linked to each other through crosslinking structures in the molecule.

$X_1$, $X_2$, $X_3$, and $X_4$ in Formula 4 may be selected from the group consisting of tetravalent aromatic organic groups represented by Formulae 7a to 7d:

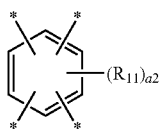
(7a)

wherein $R_{11}$ is a $C_1$-$C_{10}$ alkyl or $C_1$-$C_{10}$ fluoroalkyl group and a2 is an integer of 0 or 2,

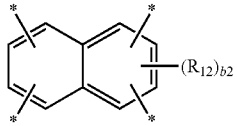
(7b)

wherein $R_{12}$ is a $C_1$-$C_{10}$ alkyl or $C_1$-$C_{10}$ fluoroalkyl group and b2 is an integer of 0 to 4,

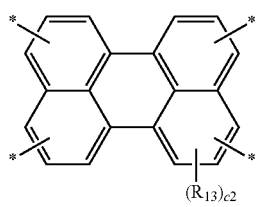
(7c)

wherein $R_{13}$ is a $C_1$-$C_{10}$ alkyl or $C_1$-$C_{10}$ fluoroalkyl group and c2 is an integer of 0 to 8, and

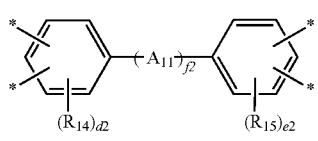
(7d)

wherein $R_{14}$ and $R_{15}$ are each independently a $C_1$-$C_{10}$ alkyl or $C_1$-$C_{10}$ fluoroalkyl group, d2 and e2 are each independently an integer of 0 to 3, f2 is an integer of 0 to 3, and $A_{11}$ is selected from the group consisting of a single bond, —O—, —$CR_{18}R_{19}$—, —C(=O)—, —C(=O)NH—, —S—, —$SO_2$—, a phenylene group, and combinations thereof (where $R_{18}$ and $R_{19}$ are each independently selected from the group consisting of a hydrogen atom, $C_1$-$C_{10}$ alkyl groups, and $C_1$-$C_{10}$ fluoroalkyl groups).

More specifically, $X_1$, $X_2$, $X_3$, and $X_4$ in Formula 3 may be selected from, but not limited, those represented by Formulae 8a to 8l:

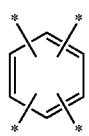
(8a)

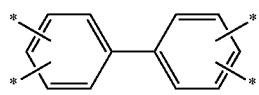
(8b)

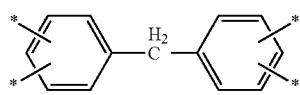
(8c)

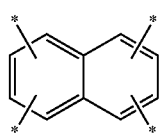
(8d)

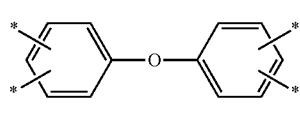
(8e)

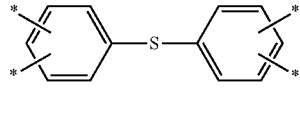
(8f)

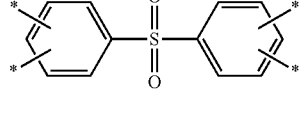
(8g)

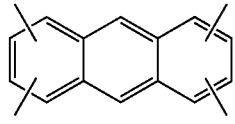
(8h)

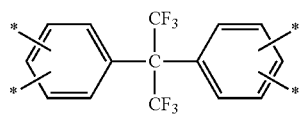
(8i)

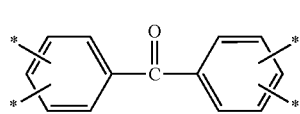
(8j)

-continued

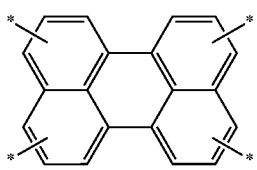
(8k)

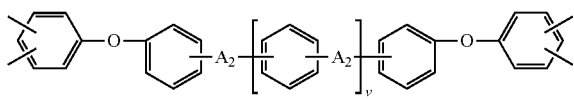
(8l)

wherein $A_2$ is selected from the group consisting of a single bond, —O—, —C(=O)—, —C(=O)NH—, —S—, —SO$_2$—, a phenylene group, and combinations thereof and v is an integer of 0 or 1.

At least one hydrogen atom present in each of the tetravalent aromatic organic groups of Formulae 8a to 8l may also be substituted with a $C_1$-$C_{10}$ alkyl group (e.g., a methyl, ethyl, propyl, isopropyl, t-butyl, pentyl or hexyl group) or a $C_1$-$C_{10}$ fluoroalkyl group (e.g., a fluoromethyl, perfluoroethyl or trifluoromethyl group).

Diamines suitable for use in the preparation of the polyimide of Formula 3 may be diamine compounds including the divalent organic groups $Y_1$, $Y_2$, and $Y_3$.

Specifically, $Y_1$, $Y_2$, and $Y_3$ in Formula 3 are divalent aromatic organic groups derived from aromatic diamine compounds or combinations thereof and may be aliphatic, alicyclic or aromatic divalent organic groups linked directly to each other or divalent organic groups linked to each other through a crosslinking structure. More specifically, $Y_1$, $Y_2$, and $Y_3$ in Formula 3 may be selected from the group consisting of functional groups represented by Formulae 9a to 9d:

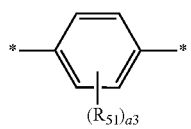
(9a)

wherein $R_{51}$ is selected from the group consisting of $C_1$-$C_{10}$ alkyl groups (e.g., methyl, ethyl, propyl, isopropyl, t-butyl, pentyl, and hexyl groups), $C_1$-$C_{10}$ fluoroalkyl groups (e.g., fluoromethyl, perfluoroethyl, and trifluoromethyl groups), $C_6$-$C_{12}$ aryl groups (e.g., phenyl and naphthalenyl groups), a sulfonic acid croup, and a carboxylic acid croup and a3 is an integer of 0 to 4,

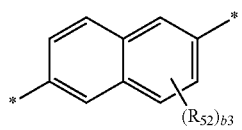
(9b)

wherein $R_{52}$ is selected from the group consisting of $C_1$-$C_{10}$ alkyl groups (e.g., methyl, ethyl, propyl, isopropyl, t-butyl, pentyl, and hexyl groups), $C_1$-$C_{10}$ fluoroalkyl groups (e.g., fluoromethyl, perfluoroethyl, and trifluoromethyl groups), $C_6$-$C_{12}$ aryl groups (e.g., phenyl and naphthalenyl groups), a sulfonic acid group, and a carboxylic acid group and b3 is an integer of 0 to 6,

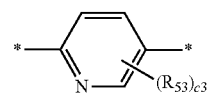
(9c)

wherein $R_{53}$ is selected from the group consisting of $C_1$-$C_{10}$ alkyl groups (e.g., methyl, ethyl, propyl, isopropyl, t-butyl, pentyl, and hexyl groups), $C_1$-$C_{10}$ fluoroalkyl groups (e.g., fluoromethyl, perfluoroethyl, and trifluoromethyl groups), $C_6$-$C_{12}$ aryl groups (e.g., phenyl and naphthalenyl groups), a sulfonic acid group, and a carboxylic acid croup and c3 is an integer of 0 to 3, and

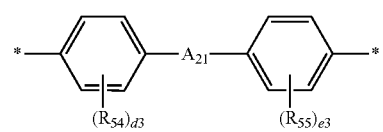
(9d)

wherein $R_{54}$ and $R_{55}$ are each independently selected from the group consisting of $C_1$-$C_{10}$ alkyl groups (e.g., methyl, ethyl, propyl, isopropyl, t-butyl, pentyl, and hexyl groups), $C_1$-$C_{10}$ fluoroalkyl groups (e.g., fluoromethyl, perfluoroethyl, and trifluoromethyl groups), $C_6$-$C_{12}$ aryl groups (e.g., phenyl and naphthalenyl groups), a sulfonic acid group, and a carboxylic acid group, d3 and e3 are each independently an integer of 0 to 4, and $A_{21}$ is selected from the group consisting of a single bond, —O—, —CR$_{56}$R$_{57}$—, —C(=O)—, —C(=O)NH—, —S—, —SO$_2$—, a phenylene group, and combinations thereof (where $R_{56}$ and $R_{57}$ are each independently selected from the group consisting of a hydrogen atom, $C_1$-$C_{10}$ alkyl groups (e.g., methyl, ethyl, propyl, isopropyl, t-butyl, pentyl, and hexyl groups), and $C_1$-$C_{10}$ fluoroalkyl groups (e.g., fluoromethyl, perfluoroethyl, and trifluoromethyl groups).

$Y_1$, $Y_2$, and $Y_3$ in Formula 3 may be combinations of the functional groups of Formulae 9a to 9d.

The presence of amino groups at the para-position means the location of the amino groups at the 1- and 4-positions of a single benzene ring but is not limited to this location. For a fused benzene ring or a structure of benzene rings linked via a linking group, the presence of amino groups at the para-position means that the amino groups are substituted at the most distant positions from each other.

More specifically, the divalent organic group including amino groups at the para-position may be selected from the group consisting of functional groups represented by Formulae 10a to 10q:

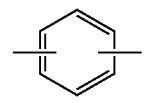
(10a)

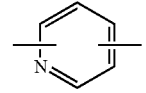
(10b)

-continued (10c) 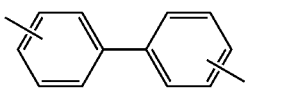

(10d) 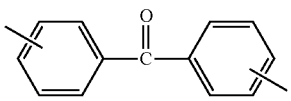

(10e) 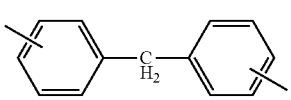

(10f) 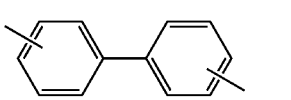

(10g) 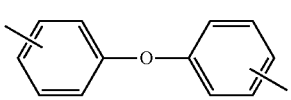

(10h) 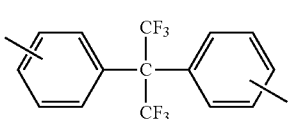

(10i) 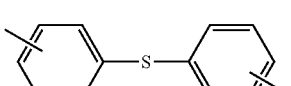

(10j) 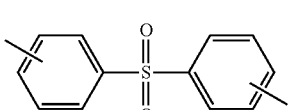

(10k) 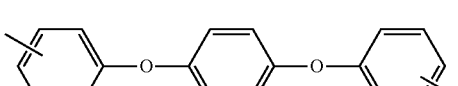

(10l) 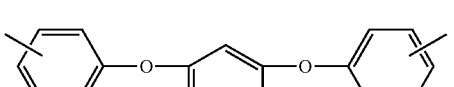

(10m) 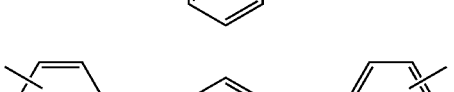

(10n) 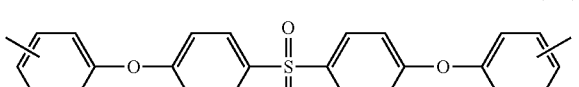

(10o) 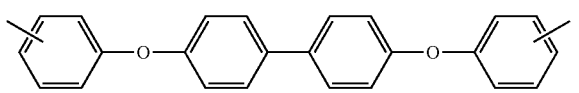

(10p) 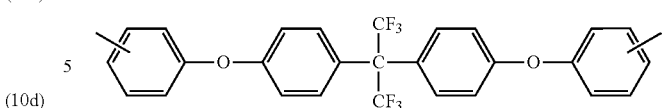

(10q) 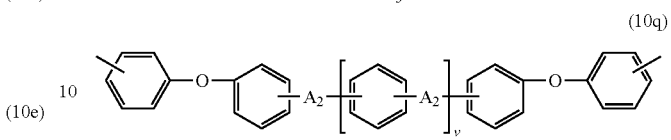

wherein $A_2$ is selected from the group consisting of a single bond, —O—, —$CR_{56}R_{57}$—, —C(=O)—, —C(=O)NH—, —S—, —$SO_2$—, a phenylene group, and combinations thereof (where $R_{56}$ and $R_{57}$ are each independently selected from the group consisting of a hydrogen atom, $C_1$-$C_{10}$ alkyl groups (e.g., methyl, ethyl, propyl, isopropyl, t-butyl, pentyl, and hexyl groups), and $C_1$-$C_{10}$ fluoroalkyl groups (e.g., fluoromethyl, perfluoroethyl, and trifluoromethyl groups)), and v is an integer of 0 or 1.

One or more hydrogen atoms in each of the divalent functional groups of Formulae 10a to 10q may also be substituted with substituents selected from the group consisting of $C_1$-$C_{10}$ alkyl groups (e.g., methyl, ethyl, propyl, isopropyl, t-butyl, pentyl, and hexyl groups), $C_1$-$C_{10}$ fluoroalkyl groups (e.g., fluoromethyl, perfluoroethyl, and trifluoromethyl groups), $C_6$-$C_{12}$ aryl groups (e.g., phenyl and naphthalenyl groups), a sulfonic acid group, and a carboxylic acid group.

The polyimide of Formula 3 may be prepared by polymerization of the tetracarboxylic dianhydride and the diamine compound. The polymerization reaction may be carried out by any suitable polymerization process, such as solution polymerization, for the preparation of polyimides or precursors thereof.

Specifically, according to solution polymerization, the diamine compound is dissolved in a polymerization solvent and the acid dianhydride is added to the solution to react with the diamine compound.

It is preferred to react the acid dianhydride with the diamine compound in an appropriate ratio taking into consideration the physical properties of the final polyimide. Specifically, the diamine compound is reacted with the acid dianhydride in a molar ratio of about 1:1.8, preferably 1:1.1 to 1:1.5, more preferably 1:1.1 to 1:1.3. That is, the polyimide having terminal dianhydride groups is prepared by reacting the excess acid dianhydride with the diamine.

Specifically, the polymerization solvent is an organic solvent selected from the group consisting of ketones, such as methyl ethyl ketone and cyclohexanone, aromatic hydrocarbons, such as toluene, xylene, and tetramethylbenzene, glycol ethers (cellosolves), such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, and triethylene glycol monoethyl ether, ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N,N-dimethylacetamide (DMAc), N-methylpyrrolidone (NMP), N-ethylpyrrolidone (NEP), 1,3-dimethyl-2-imidazolidinone, N,N-dimethylmethoxyacetamide, dimethyl sulfoxide, pyridine, dimethyl sulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, and mixtures thereof. Preferably, the polymerization solvent is N,N-diethylacetamide, N,N-diethylformamide, N-ethylpyrrolidone or a mixture thereof.

The polymerization reaction is preferably carried out at a temperature of about 30 to about 65° C. or about 40 to about 60° C. for about 5 to about 50 hours, about 10 to about 40 or about 20 to about 30 hours after stirring at a temperature of about 10 to less than about 30° C., at a temperature of about 15 to about 25° C. or at room temperature for about 0.5 to about 5 hours or about 1 to about 3 hours.

When the polyamic acid or the polyimide is synthesized, excess polyamino groups or acid anhydride groups need to be inactivated. To this end, a dicarboxylic anhydride or a monoamine may be further added as an end-capping agent to cap the ends of the polyimide. The polyimide is preferably end-capped with a dicarboxylic anhydride.

Examples of dicarboxylic anhydrides suitable for end-capping the polyimide or the polyamic acid include phthalic anhydride, 2,3-benzophenonedicarboxylic anhydride, 3,4-benzophenonedicarboxylic anhydride, 2,3-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride. These dicarboxylic anhydrides may have a group unreactive with amines or dicarboxylic anhydrides in their molecules.

Examples of monoamines suitable for end-capping the polyimide or the polyamic acid include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophnyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophnyl phenyl sulfone, α-naphthylamine, β-naphthylamine, 1-amino-2-naphthol, 2-amino-1-naphthol, 4-amino-1-naphthol, 5-amino-1-naphthol, 5-amino-1-naphthol, 5-amino-2-naphthol, 7-amino-2-naphthol, 8-amino-2-naphthol, 1-aminoanthracene, 2-aminoanthracene, and 9-aminoanthracene. These monoamines may have a group unreactive with amines or dicarboxylic anhydrides in their molecules.

The end-capping agent is added in an amount of 20 parts by weight or less, preferably 1 to 10 parts by weight, more preferably 1 to 5 parts by weight, based on 100 parts by weight of the sum of the tetracarboxylic dianhydride and the diamine.

After the polymerization reaction, the resulting polyamic acid is imidized. Specifically, the imidization may be performed by chemical imidization or thermal imidization. Thermal imidization is preferred.

Specifically, the chemical imidization may be performed using a dehydrating agent. The dehydrating agent may be, for example, an acid anhydride, such as acetic anhydride, propionic anhydride or benzoic anhydride, or its acid chloride, or a carbodiimide compound, such as dicyclohexylcarbodiimide. The dehydrating agent is preferably used in an amount of 0.1 to 10 moles per mole of the acid dianhydride. The chemical imidization may also be effected in combination with heating at a temperature of 60 to 120° C.

The thermal imidization may be performed by heat treatment at a temperature of 80 to 400° C. As a result of dehydration, water is formed, which is more preferably removed by azeotropic distillation with benzene, toluene or xylene.

The chemical or thermal imidization process may be carried out in the presence of a base catalyst, such as pyridine, isoquinoline, trimethylamine, triethylamine, N,N-dimethylaminopyridine, imidazole, 1-methylpiperidine or 1-methylpiperazine. The base catalyst may be used in an amount of 0.1 to 5 moles per mole of the acid dianhydride.

During the imidization process, water is formed from H of the —CO—NH— group and OH of the —CO—OH group and leaves from the polyamic acid molecule, giving the polyimide having a cyclic chemical structure (—CO—N—CO—).

The polyimide may be separated from the polymerization solvent and dried before use. The polyimide is separated by adding a poor solvent for the polyimide to the polyimide solution to obtain a precipitate, which is then subjected to a series of processes, such as filtration, washing, and drying. The poor solvent may be, for example, methanol or isopropyl ether. Thereafter, the polyimide may be re-dissolved in the same organic solvent as that used in the polymerization reaction.

The polyimide has a number average molecular weight of 500 to 80,000 g/mol. The modified polyimide has a number average molecular weight of 500 to 80,000 g/mol, preferably 500 to 50,000 g/mol or 500 to 30,000 g/mol. The ratio of the weight average molecular weight to the number average molecular weight (Mw/Mn) of the modified polyimide is from 1 to 3, preferably from 1 to 2.

If the polyimide and the modified polyimide have number average molecular weights lower than 500 g/mol, the mechanical properties of films produced therefrom may deteriorate. Meanwhile, if the polyimide and the modified polyimide have number average molecular weights higher than 80,000, their flowability may be so low that problems, such as non-uniform coating, may arise during processing.

The polyimide may be in the form of an oligomer with a relatively low molecular weight. In this case, the polyimide possesses a number of reactive sites capable of reacting with curable reactive groups and has improved transmittance and low yellowness index (YI) resulting from its low molecular weight.

According to one embodiment of the present invention, the polyimide is dissolved in a solvent and reacts with the compound of Formula 2 including a curable functional group at room temperature to 80° C. for 5 to 30 hours, preferably for 10 to 30 hours, giving the modified polyimide including the repeating unit of Formula 1. If the reaction temperature is too high or the reaction time is excessively long, the polyimide solution may be gelled, resulting in non-uniform coating.

Any solvent that can dissolve the polyimide may be used in the reaction of the polyimide and the compound of Formula 2. Examples of such solvents include, aprotic solvents, such as N-methylpyrrolidone (NMP), N-ethylpyrrolidone (NEP) gamma-butyrolactone (GBL), dimethylformamide (DMF), diethylformamide (DEF), dimethylacetamide (DMAc), diethylacetamide (DEAc), tetrahydrofuran (THF), and 2-butyl cellosolve, meta-cresol, phenol, and halogenated phenols.

The polyimide may react with the compound of Formula 2 in a ratio of 1:2 to 1:8, preferably 1:2 to 1:6.

The modified polyimide is mixed with a photopolymerization or thermal polymerization initiator and a solvent to prepare a curable resin composition.

The solvent is not particularly limited so long as it can uniformly dissolve the initiator and the modified polyimide and at the same time is chemically stable enough not to react with the other components of the composition. For example, the solvent may be an aprotic solvent, such as N-methylpyrrolidone (NMP), N-ethylpyrrolidone (NEP) gamma-butyrolactone (GBL), dimethylformamide (DMF), diethylformamide (DEF), dimethylacetamide (DMAc), diethylacetamide (DEAc), tetrahydrofuran (THF) or 2-butyl cellosolve, meta-cresol, phenol or a halogenated phenol.

The photopolymerization initiator may be, for example, one that serves to initiate radical photocuring in an exposed portion of the resin composition. The photopolymerization initiator may be any of those known in the art and examples thereof include: benzoin compounds, such as benzoin, benzoin methyl ether, benzoin ethyl ether, and alkyl ethers thereof; acetophenone compounds, acetophenone, 2,2-dimethoxy-2-phenylacetophenone, 1,1-dichloroacetophenone, and 4-(1-t-butyldioxy-1-methylethyl)acetophenone; anthraquinone compounds, such as 2-methylanthraquinone, 2-amylanthraquinone, 2-t-butylanthraquinone, and 1-chloroanthraquinone; thioxanthone compounds, such as 2,4-dimethylthioxanthone, 2,4-diisopropylthioxanthone, and 2-chlorothioxanthone; ketal compounds, such as acetophenone dimethyl ketal and benzyl dimethyl ketal; and benzophenone compounds, such as benzophenone, 4-(1-t-butyl-dioxy-1-methylethyl)benzophenone, and 3,3',4,4'-tetrakis(t-butyl dioxycarbonyl)benzophenone.

α-aminoacetophenone compounds, such as 2-methyl-1-[4-(methylthio)phenyl]-2-morpholinopropanone-1,2-benzyl-2-dimethylamino-1-(4-morpholinophenyl)-butan-1-one, 2-(dimethylamino)-2-[(4-methylphenyl)methyl]-1-[4-(4-morpholinyl)phenyl]-1-butanone, N,N-dimethylaminoacetophenone (Irgacure® 907, Irgacure® 369, and Irgacure® 379 available from Ciba Specialty Chemicals (now Ciba Japan), and acylphosphine oxide compounds, such as 2,4,6-trimethylbenzoyldiphenylphosphine oxide, bis(2,4,6-trimethylbenzoyl)-phenylphosphine oxide, and bis(2,6-dimethoxybenzoyl)-2,4,4-trimethyl-pentylphosphine oxide (e.g., Lucilin® TPO available from BASF and Irgacure® 819 available from Ciba Specialty Chemicals may also be used as suitable photoinitiators.

As other suitable photoinitiators, there may be mentioned oxime ester compounds. Specific examples of the oxime ester compounds include 2-(acetyloxyiminomethyl)thioxanthen-9-one, (1,2-octanedione, 1-[4-(phenylthio)phenyl]-, 2-(O-benzyloxime)), (ethanone, 1-[9-ethyl-6-(2-methyl-benzoyl)-9H-carbazol-3-yl]-, 1-(0-acetyloxime)). Examples of commercially available products for these oxime ester compounds include GGI-325, Irgacure OXE01 and Irgacure OXE02 from Ciba Specialty Chemicals, N-1919 from ADEKA, and Darocur TPO from Ciba Specialty Chemicals. In addition to these, biimidazole compounds and triazine compounds may also be used as photoinitiators.

The photopolymerization initiator may be present in an amount of about 0.5 to about 20% by weight, about 1 to about 10% by weight or about 1 to about 5% by weight, based on the total weight of the resin composition. If the content of the photoinitiator is less than the lower limit defined above, sufficient photocuring may not occur.

As the thermal polymerization initiator, there may be used any general radical polymerization initiator known in the art. Examples of such radical polymerization initiators include: azo compounds, such as 2,2'-azobisisobutyronitrile, 2,2'-azobis(2,4-dimethylvaleronitrile), and 2,2'-azobis(4-methoxy-2,4-dimethylvaleronitrile); organic peroxides, such as benzoyl peroxide, t-butyl peroxypivalate, and 1,1'-bis-(t-butylperoxy)cyclohexane; and hydrogen peroxide. When a peroxide is used as a radical polymerization initiator, it can act as a redox initiator in combination with a reducing agent. The use of the azo compounds is preferred.

The thermal polymerization initiator is present in an amount of about 0.5 to about 20% by weight, about 1 to about 15% by weight or about 5 to about 10% by weight, based on the total weight of the resin composition. If the content of the photoinitiator is less than the lower limit defined above, sufficient photocuring may not occur.

According to one embodiment, the curable resin composition may further include a polymerizable compound having an ethylenically unsaturated bond and/or a urethane (meth)acrylate compound.

The polymerizable compound having an ethylenically unsaturated bond can improve the heat resistance and surface hardness of a polyimide protective film obtained in a subsequent step.

The polymerizable compound having an ethylenically unsaturated bond may be selected from monofunctional, difunctional, trifunctional, and higher functional (meth)acrylates. Examples of the monofunctional (meth)acrylates include 2-hydroxyethyl (meth)acrylate, carbitol (meth)acrylate, isobornyl (meth)acrylate, 3-methoxybutyl (meth)acrylate, and 2-(meth)acryloyloxyethyl-2-hydroxypropyl phthalate.

Examples of the difunctional (meth)acrylates include ethylene glycol (meth)acrylate, 1,6-hexanediol (meth)acrylate, 1,9-nonanediol (meth)acrylate, propylene glycol (meth)acrylate, tetraethylene glycol (meth)acrylate, and bisphenoxy ethanol fluorene diacrylate.

Examples of the trifunctional and higher functional (meth)acrylates include tris(hydroxyethyl)isocyanurate tri(meth)acrylate, trimethylolpropane tri(meth)acrylate, pentaerythritol tri(meth)acrylate, pentaerythritol tetra(meth)acrylate, and dipentaerythritol hexa(meth)acrylate.

These monofunctional, difunctional, trifunctional, and higher functional (meth)acrylates may be used alone or in combination of two or more thereof.

The polymerizable compound may be present in an amount of 20 to 100 parts by weight, 20 to 70 parts by weight, preferably 20 to 50 parts by weight, based on 100 parts by weight of the modified polyimide of Formula 4. If the content of the polymerizable compound is less than 20 parts by weight, based on 100 parts by weight of the modified polyimide, the degree of curing of the modified polyimide cannot be improved. Meanwhile, if the content of the polymerizable compound exceeds 100 parts by weight, the adhesiveness of a resulting coating film tends to deteriorate.

The urethane (meth)acrylate compound may be, for example, selected from: hydroxy(meth)acrylate compounds, such as hydroxymethyl (meth)acrylate, hydroxyethyl (meth) acrylate, and tetramethylolethane tri(meth)acrylate; and urethane (meth)acrylates containing an allophanate modified polyisocyanurate. The urethane (meth)acrylate compound may be present in an amount of 20 to 100 parts by weight, 30 to 80 parts by weight, preferably 40 to 60 parts by weight, based on 100 parts by weight of the modified polyimide of Formula 4. If the content of the polymerizable compound is less than 20 parts by weight, based on 100 parts by weight of the modified polyimide, the degree of curing of the modified polyimide cannot be improved. Meanwhile, if the content of the polymerizable compound exceeds 100 parts by weight, the adhesiveness of a resulting coating film tends to deteriorate.

According to one embodiment, the urethane resin has a weight average molecular weight in the range of 1,000 to 20,000. Within this range, the viscosity of the composition can be controlled such that high processing efficiency is achieved.

The heat curable resin composition of the present invention may further include one or more additives selected from the group consisting of surfactants, adhesion aids, radical thermal polymerization initiators, and antioxidants.

The present invention will be explained in detail with reference to the following examples, including comparative examples. These examples are merely illustrative and the scope of the invention is not limited thereto.

PREPARATIVE EXAMPLE 1

Modified TFMB-ODPA (1:1.1) Polyimide Polymerization (3 Mol MOI)

1 mol of 2,2'-bis(trifluoromethyl)-4,4'-diaminobiphenyl (TFMB) was dissolved in 80 g of diethylformamide (DEF), and 1.1 mol of 4,4'-oxydiphthalic anhydride (ODPA) were added thereto. The mixture was allowed to polymerize in 50 g of diethylformamide (DEF) at 50° C. for 24 h to prepare a polyamic acid solution.

40 g of toluene was added to the solution and a Dean-Stark distillation apparatus was installed to remove water. The mixture was heated to reflux at 180° C. for 12 h. The resulting polyimide solution was precipitated with methanol. The precipitate was collected, dried, and dissolved in 50 g of DEF. The solution was added with 3 mol of 2-methacryloyloxyethyl isocyanate (MOI) and 30 g of DEF. The mixture was allowed to react at room temperature for 24 h, precipitated in methanol, and dried, affording a modified polyimide.

PREPARATIVE EXAMPLE 2

Modified TFMB-ODPA (1:1.3) Polyimide Polymerization (5 Mol MOI)

1 mol of 2,2'-bis(trifluoromethyl)-4,4'-diaminobiphenyl (TFMB) was dissolved in 80 g of diethylformamide (DEF), and 1.3 mol of 4,4'-oxydiphthalic anhydride (ODPA) were added thereto. The mixture was allowed to polymerize in 50 g of diethylformamide (DEF) at 50° C. for 24 h to prepare a polyamic acid solution.

40 g of toluene was added to the solution and a Dean-Stark distillation apparatus was installed to remove water. The mixture was heated to reflux at 180° C. for 12 h. The resulting polyimide solution was precipitated with methanol. The precipitate was collected, dried, and dissolved in 50 g of DEF. The solution was added with 5 mol of 2-methacryloyloxyethyl isocyanate (MOI) and 30 g of DEF. The mixture was allowed to react at room temperature for 24 h, precipitated in methanol, and dried, affording a modified polyimide.

PREPARATIVE EXAMPLE 3

TFMB-ODPA (1:1) Polyimide Polymerization 1 mol of 2,2'-bis(trifluoromethyl)-4,4'-diaminobiphenyl (TFMB) was dissolved in 80 g of diethylformamide (DEF), and 1.1 mol of 4,4'-oxydiphthalic anhydride (ODPA) were added thereto. The mixture was allowed to polymerize in 50 g of diethylformamide (DEF) at 50° C. for 24 h to prepare a polyamic acid solution.

40 g of toluene was added to the solution and a Dean-Stark distillation apparatus was installed to remove water. The mixture was heated to reflux at 180° C. for 12 h. The resulting polyimide solution was precipitated with methanol. The precipitate was collected and dried, affording a non-modified TFMB-ODPA polyimide.

PREPARATIVE EXAMPLE 4

TFMB-BPADA (1:1) Polyimide Polymerization 1 mol of 2,2'-bis(trifluoromethyl)-4,4'-diaminobiphenyl (TFMB) was dissolved in 80 g of diethylformamide (DEF), and 1 mol of 2,2-bis[4-(2,3-dicarboxyphenoxy)phenyl]propane dianhydride (BPADA) were added thereto. The mixture was allowed to polymerize in 80 g of diethylformamide (DEF) at 50° C. for 24 h to prepare a polyamic acid solution.

50 g of toluene was added to the solution and a Dean-Stark distillation apparatus was installed to remove water. The mixture was heated to reflux at 160° C. for 12 h. The resulting polyimide solution was precipitated with methanol. The precipitate was collected and dried, affording a non-modified TFMB-BPADA polyimide.

PREPARATIVE EXAMPLE 5

TFMB-BPADA (1:1.1) Polyimide Polymerization 1 mol of 2,2'-bis(trifluoromethyl)-4,4'-diaminobiphenyl (TFMB) was dissolved in 80 g of diethylformamide (DEF), and 1.1 mol of 2,2-bis[4-(2,3-dicarboxyphenoxy)phenyl] propane dianhydride (BPADA) were added thereto. The mixture was allowed to polymerize in 80 g of diethylformamide (DEF) at 50° C. for 24 h to prepare a polyamic acid solution.

50 g of toluene was added to the solution and a Dean-Stark distillation apparatus was installed to remove water. The mixture was heated to reflux at 160° C. for 12 h. The resulting polyimide solution was precipitated with methanol. The precipitate was collected and dried, affording a non-modified TFMB-BPADA polyimide.

PREPARATIVE EXAMPLE 6

TFMB-BPADA (1:1.3) Polyimide Polymerization 1 mol of 2,2'-bis(trifluoromethyl)-4,4'-diaminobiphenyl (TFMB) was dissolved in 80 g of diethylformamide (DEF), and 1.3 mol of 2,2-bis[4-(2,3-dicarboxyphenoxy)phenyl] propane dianhydride (BPADA) were added thereto. The mixture was allowed to polymerize in 80 g of diethylformamide (DEF) at 50° C. for 24 h to prepare a polyamic acid solution.

50 g of toluene was added to the solution and a Dean-Stark distillation apparatus was installed to remove water. The mixture was heated to reflux at 160° C. for 12 h. The resulting polyimide solution was precipitated with methanol. The precipitate was collected and dried, affording a non-modified TFMB-BPADA polyimide.

PREPARATIVE EXAMPLE 7

Modified TFMB-BPADA (1:1.1) Polyimide Polymerization (3 Mol MOI)—Room Temperature, 10 h 1 mol of 2,2'-bis(trifluoromethyl)-4,4'-diaminobiphenyl (TFMB) was dissolved in 80 g of diethylformamide (DEF), and 1.1 mol of 2,2-bis[4-(2,3-dicarboxyphenoxy)phenyl] propane dianhydride (BPADA) were added thereto. The mixture was allowed to polymerize in 80 g of diethylformamide (DEF) at 50° C. for 24 h to prepare a polyamic acid solution.

50 g of toluene was added to the solution and a Dean-Stark distillation apparatus was installed to remove water. The mixture was heated to reflux at 160° C. for 12 h. The resulting polyimide solution was precipitated with methanol. The precipitate was collected, dried, and dissolved in 50 g of DEF. The solution was added with 3 mol of 2-methacryloyloxyethyl isocyanate (MOI) and 30 g of DEF. The mixture was allowed to react at room temperature for 10 h, precipitated in methanol, and dried, affording a modified polyimide.

PREPARATIVE EXAMPLE 8

Modified TFMB-BPADA (1:1.1) Polyimide Polymerization (3 Mol MOI)—Room Temperature, 10 h/50° C., 6 h 1 mol of 2,2'-bis(trifluoromethyl)-4,4'-diaminobiphenyl (TFMB) was dissolved in 80 g of diethylformamide (DEF), and 1.1 mol of 2,2-bis[4-(2,3-dicarboxyphenoxy)phenyl] propane dianhydride (BPADA) were added thereto. The mixture was allowed to polymerize in 80 g of diethylformamide (DEF) at 50° C. for 24 h to prepare a polyamic acid solution.

50 g of toluene was added to the solution and a Dean-Stark distillation apparatus was installed to remove water. The mixture was heated to reflux at 160° C. for 12 h. The resulting polyimide solution was precipitated with methanol. The precipitate was collected, dried, and dissolved in 50 g of DEF. The solution was added with 3 mol of 2-methacryloyloxyethyl isocyanate (MOI) and 30 g of DEF. The mixture was allowed to react at room temperature for 10 h. The reaction mixture was allowed to further react at 50° C. for 6 h, precipitated in methanol, and dried, affording a modified polyimide.

<Preparation of Heat Curable Coating Compositions>

EXAMPLE 1

10 g of the modified polyimide prepared in Preparative Example 1 was mixed with 1 g of 2,2'-azobis(2,4-dimethylvaleronitrile) (V65, WAKO CHEMICAL, 10 hour half-life temperature: 50° C.) as a thermal polymerization initiator. To the mixture was added diethylformamide (DEF) in such an amount that the solid content was 30 wt %, giving a heat curable coating composition.

EXAMPLE 2

3 g of dipentaerythritol hexaacrylate (DPHA) was added to 10 g of the modified polyimide prepared in Preparative Example 1, and then 1 g of 2,2'-azobis(2,4-dimethylvaleronitrile) (V65, WAKO CHEMICAL, 10 hour half-life temperature: 50° C.) as a thermal polymerization initiator was added thereto. To the mixture was added diethylformamide (DEF) in such an amount that the solid content was 30 wt %, giving a heat curable coating composition.

EXAMPLE 3

5 g of a urethane acrylic oligomer (SP260, SOLTECH LTD.) and 4 g of dipentaerythritol hexaacrylate (DPHA) were sequentially added to 10 g of the modified polyimide prepared in Preparative Example 1, and then 1 g of 2,2'-azobis(2,4-dimethylvaleronitrile) (V65, WAKO CHEMICAL, 10 hour half-life temperature: 50° C.) as a thermal polymerization initiator was added thereto. To the mixture was added diethylformamide (DEF) in such an amount that the solid content was 30 wt %, giving a heat curable coating composition.

EXAMPLE 4

5 g of a urethane acrylic oligomer (SU5260, SOLTECH LTD.) and 4 g of dipentaerythritol hexaacrylate (DPHA) were sequentially added to 10 g of the modified polyimide prepared in Preparative Example 1, and then 1 g of 2,2'-azobis(2,4-dimethylvaleronitrile) (V65, WAKO CHEMICAL, 10 hour half-life temperature: 50° C.) as a thermal polymerization initiator was added thereto. To the mixture was added diethylformamide (DEF) in such an amount that the solid content was 30 wt %, giving a heat curable coating composition.

COMPARATIVE EXAMPLE 1

5 g of a urethane acrylic oligomer (SU594, SOLTECH LTD.) and 4 g of dipentaerythritol hexaacrylate (DPHA) were sequentially added to 10 g of the polyimide prepared in Preparative Example 3, and then 1 g of 2,2'-azobis(2,4-dimethylvaleronitrile) (V65, WAKO CHEMICAL, 10 hour half-life temperature: 50° C.) as a thermal polymerization initiator was added thereto. To the mixture was added diethylformamide (DEF) in such an amount that the solid content was 30 wt %, giving a heat curable coating composition.

COMPARATIVE EXAMPLE 2

10 g of the polyimide prepared in Preparative Example 3 was mixed with 1 g of 2,2'-azobis(2,4-dimethylvaleronitrile) (V65, WAKO CHEMICAL, 10 hour half-life temperature: 50° C.) as a thermal polymerization initiator. To the mixture was added diethylformamide (DEF) in such an amount that the solid content was 30 wt %, giving a heat curable coating composition.

EXPERIMENTAL EXAMPLES

Experimental Example 1

Measurement of Optical Properties of Coating Films

Each of the heat curable coating compositions prepared in Examples 1-4 and Comparative Examples 1-2 was spin coated on a 50 µm thick glass substrate. The coated substrate was heated to 250° C. at a rate of 3° C./min in an oven under a nitrogen atmosphere. After heating for additional 60 min, a ~21 µm thick monolayer polymer film was peeled from the substrate.

The polyimide films were measured for optical properties, including transmittance, yellowness index, retardation value, and coefficient of thermal expansion by the following procedures. The results are shown in Table 1.

Transmittance was measured using a transmittance meter (HR-100, Murakami Color Research Laboratory) in accordance with JIS K 7105.

Yellowness index (YI) was measured using a colorimeter [Colorimeter] (Color Eye 7000A).

The thickness retardation (Rth) of each film was measured using Axoscan. First, the film was cut to a predetermined size and the thickness of the sample was measured. The retardation of the sample was measured using Axoscan and the measured thickness was input while calibrating in the C-plate direction to compensate for the retardation value. The refractive index of the sample was measured by inputting the refractive index of the polyimide.

polyimide with the isocyanate. The proton peaks of $OCH_2$ adjacent to C=O of the imide rings and C=O of the acrylic groups were observed at 5.5 ppm and 4.4 ppm, respectively. The proton peaks of $CH_2$=C corresponding to the double bonds of the acrylic groups could be found between 5.5 ppm and 6 ppm.

Experimental Example 3

Molecular Weight Measurement

<Measurement of Number Average Molecular Weight Using $^{13}$C-NMR>

$^{13}$C-NMR spectra of the polyimides prepared in Preparative Examples 4-6 were measured. The number average molecular weight of each modified polyimide was determined by comparing the integral value of $CF_3$ peak was compared with that of $(COO)_2O$ peak of the terminal acid dianhydride groups.

$^{13}$C-NMR spectra were recorded on an AVENCE III HD 700 MHz NMR spectrometer. Chemical shifts are reported in ppm relative to the peak of trimethylsilane (TMS) at 0 ppm.

TABLE 1

|  |  | Comparative Example 1 | Comparative Example 2 | Example 1 | Example 2 | Example 3 | Example 4 |
|---|---|---|---|---|---|---|---|
| Thickness | mm | 21 | 21 | 21 | 21 | 21 | 21 |
| UV transmittance | 550 nm % | 10 | 87.6 | 88.7 | 90 | 90 | 90 |
|  | 460 nm % | 2 | 73 | 84 | 86 | 88 | 88 |
|  | Cut off nm | 450 | 368 | 361 | 361 | 355 | 355 |
| Haze | % | 1.0 | 70 | 0.8 | 0.8 | 0.4 | 0.3 |
| Y.I | — | 10 | 19 | 6.0 | 4.7 | 2.2 | 2.2 |
| $R_{th}$ $[(n_x + n_y)/2 - n_z]d$ | nm | 500 | 120 | 154 | 154 | 56 | 53 |
| $T_g$ | ° C. | 280 | — | 255 | 225 | 240 | 260 |

Experimental Example 2

Confirmation of Synthesis of the Modified Polyimides

<Attenuated Total Reflectance (ATR) Measurement>

The ATR peaks of the modified polyimides prepared in Preparative Examples 1-2 were compared with those of the polyimide prepared in Preparative Example 3 to confirm the presence of acrylate groups in the modified polyimides. The results are shown in FIGS. 1 and 2.

Figure 2:
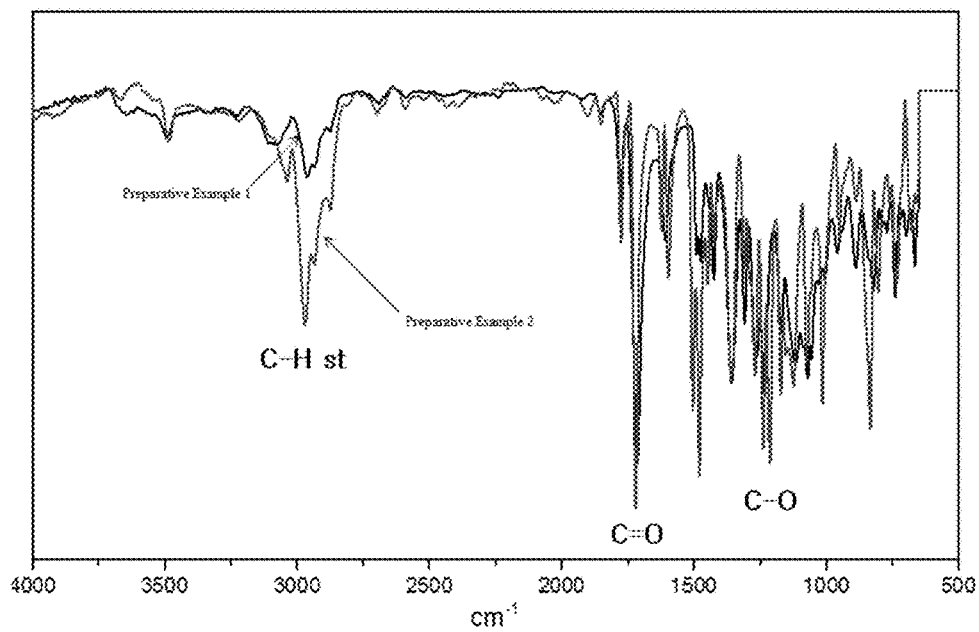
FIG. 2 shows ATR spectra of polyimides prepared in Preparative Examples 1 and 2 from which ATR peaks of a polyimide prepared in Preparative Example 3 are excluded.

FIG. 1 shows ATR spectra of the acrylate modified TFMB-ODPA polyimide prepared in Preparative Example 2 (1a) and the TFMB-ODPA polyimide prepared in Preparative Example 3 (1 b). The peaks of the TFMB-ODPA polyimide (1b) were subtracted from the peaks of the modified polyimide (1a). The remaining peaks ((c) of FIG. 1) indicate the presence of acrylate groups bonded to the modified TFMB-ODPA polyimide of Preparative Example 2.

<Measurement of HMBC NMR ($^1$H-$^{13}$C) and COSY NMR ($^1$H-$^1$H)>

HMBC NMR ($^1$H-$^{13}$C) and COSY NMR ($^1$H-$^1$H) spectra were recorded on an AVENCE III HD 700 MHz NMR spectrometer. Chemical shifts are reported in ppm relative to the peak of trimethylsilane (TMS) at 0 ppm.

Figure 3:
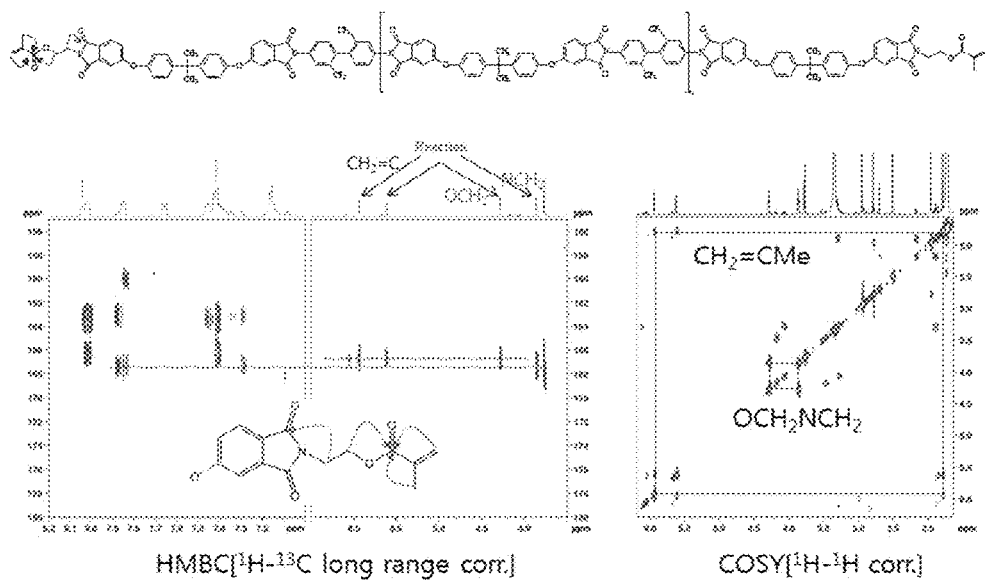
FIG. 3 shows HMBC NMR ($^1$H-$^{13}$C) and COSY NMR ($^1$H-$^1$H) spectra of a polyimide prepared in Preparative Example 5.

HMBC NMR ($^1$H-$^{13}$C) and COSY NMR ($^1$H-$^1$H) spectra of the modified polyimide prepared in Preparative Example 8 are shown in FIG. 3. The proton peaks at 4-4.5 ppm in FIG. 3 reveal the presence of —$NCH_2$ of the polyimide rings formed due to the reaction of the terminal groups of the The measured molecular weights and PDI values are shown in Table 2.

<Measurement of Number Average Molecular Weight and Weight Average Molecular Weight Using Gel Permeation Chromatography (GPC)>

The number average molecular weight and weight average molecular weight of each of the polyimides prepared in Preparative Examples 4-6 were measured using gel permeation chromatography (GPC) to determine the PDI value of the polyimide. For GPC measurement, a mixture of THF and DMF (50:50, v/v) was used as the eluent.

The results are shown in Table 2.

TABLE 2

|  | Mol ratio | | Mn by $^{13}$C-NMR[a] | Mn by GPC | PDI by GPC[b] |
|---|---|---|---|---|---|
|  | BPADA | TFMB | (g/mol) | (g/mol) |  |
| Preparative Example 4 | 1.0 | 1.0 | — | 24,500 | 2.06 |
| Preparative Example 5 | 1.1 | 1.0 | 9700 | 8811 | 1.77 |
| Preparative Example 6 | 1.3 | 1.0 | 4591 | 5211 | 1.28 |

[a]$CF_3$:—$(COO)_2O$
[b]PDI = $M_w/M_n$

Experimental Example 4

Figure 4:
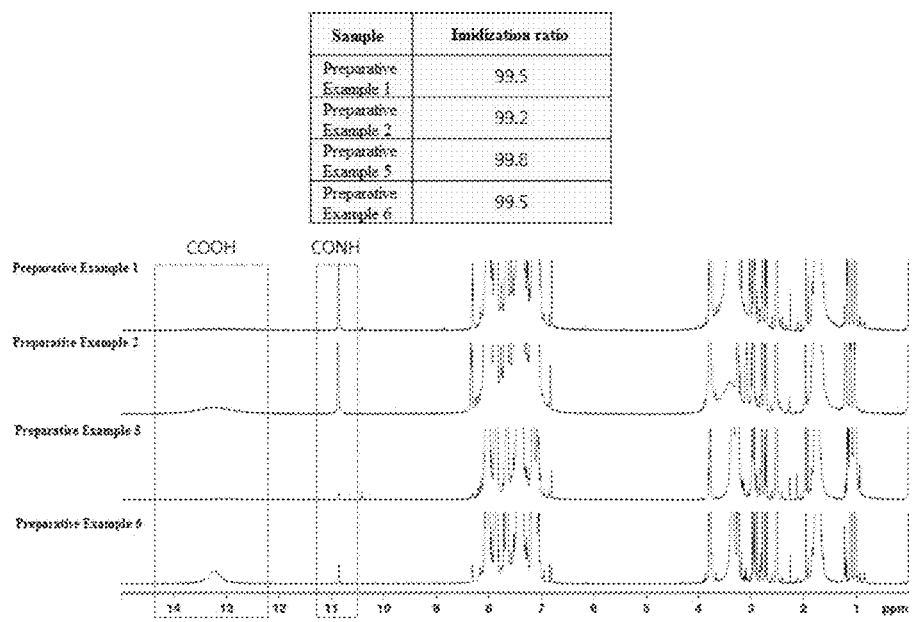
FIG. 4 shows $^1$H-NMR spectra of polyimides prepared in Preparative Examples 1, 2, 5, and 6 and imidization ratios of the polyimides calculated from the spectra.

Measurement of Imidization Ratio Using $^1$H-NMR $^1$H-NMR spectra of the polyimides prepared in Preparative Examples 1, 2, 5, and 6 were measured and are shown in FIG. 4. In each $^1$H-NMR spectrum, the proton of the structure remaining unchanged before and after imidization was defined as the standard proton, and the integral value of the peak of the standard proton and the integral value of the peak corresponding to the proton of the NH group of the amide moiety found at around 10-11 ppm were used to calculate the imidization ratio of the polyimide.

$^1$H-NMR spectra were recorded on an AVENCE III HD 700 MHz NMR spectrometer. Chemical shifts are reported in ppm relative to the peak of trimethylsilane (TMS) at 0 ppm.

As shown in FIG. 4, the acrylic modified polyimides prepared in Preparative Examples 1-2 showed high imidization ratios and were found to have high peaks corresponding to the proton of CONK However, no substantial peak corresponding to the proton of COOH was observed. This provides a basis for the presence of the repeating structure of Formula 5 or 6 in the main chains of the polyimides of Examples 1 and 2.

Experimental Example 5

Evaluation of Reactivity Depending on Reaction Temperature

The polyimide prepared in Preparative Example 5 was dissolved in 50 g of DEF, and 3 mol of 2-methacryloyloxyethyl isocyanate (MOI) and 30 g of DEF were sequentially added thereto. The mixture was allowed to react at various temperatures (room temperature, 50° C., 80° C., and 100° C.) for 10 h. The states of the reaction solution were observed.

The polyimide prepared in Preparative Example 6 was dissolved in 50 g of DEF, and 5 mol of 2-methacryloyloxyethyl isocyanate (MOI) and 30 g of DEF were sequentially added thereto. The mixture was allowed to react at various temperatures (room temperature, 50° C., 80° C., and 100° C.) for 10 h. The states of the reaction solutions were observed.

The results are shown in Table 3.

TABLE 3

| Temperature (° C.) | BPADA Preparative Example 5 | TFMB Preparative Example 6 |
|---|---|---|
| r.t | Homogeneous | Homogeneous |
| 50 | Homogeneous | Homogeneous |
| 80 | Gelation | Gelation |
| 100 | Gelation | Gelation |

Experimental Example 6

Figure 5:
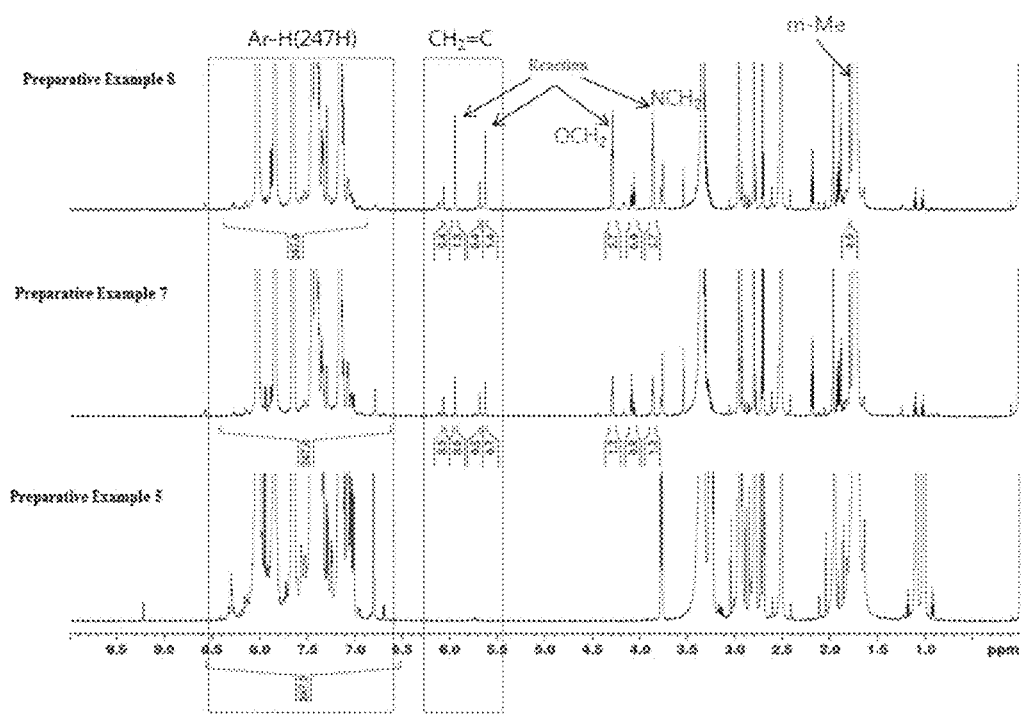
FIG. 5 shows $^1$H-NMR spectra of polyimides prepared in Preparative Examples 5, 7, and 8.

Evaluation of Reactivity Depending on Reaction Temperature and Time $^1$H-NMR spectra of the modified polyimides prepared in Preparative Examples 5, 7, and 8 were measured and are shown in FIG. 5. Changes in the reactivity of the isocyanate depending on temperature and time were evaluated by calculating the ratios of the integral values of the proton peaks of the acrylate-related $CH_2$=C, $OCH_2$, and $NCH_2$ to the integral value of the Ar—H proton of each modified polyimide.

As shown in FIG. 5, the intensities of the acrylate-related proton peaks in the spectrum of the modified polyimide of Preparative Example 8 were on average 2 times larger than those in the spectrum of the modified polyimide of Preparative Example 7. The modified polyimide of Preparative Example 7 was prepared by reacting the polyimide with the isocyanate at room temperature for 10 h, whereas the modified polyimide of Preparative Example 7 was prepared by reacting the polyimide with the isocyanate at room temperature for 10 h and at 50° C. for additional 6 h. The increased peak intensities demonstrate that a larger number of acrylate groups were bonded to the main chain of the polyimide of the Preparative Example 8 by the reaction of the polyimide and the isocyanate. These results lead to the conclusion that the number of the curable functional groups introduced into the polyimide can be controlled by optimizing the reaction temperature and time conditions.

What is claimed is:

1. A modified polyimide comprising a terminal group represented by Formula 1:

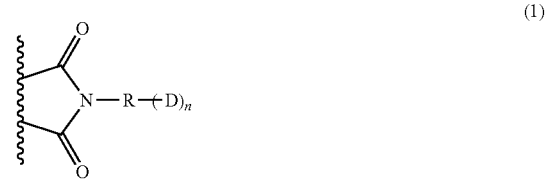

(1)

wherein D is a heat curable or photocurable functional group, R is a divalent or higher polyvalent organic group, and n is an integer of 1 or greater, and wherein the modified polyimide is represented by Formula 4:

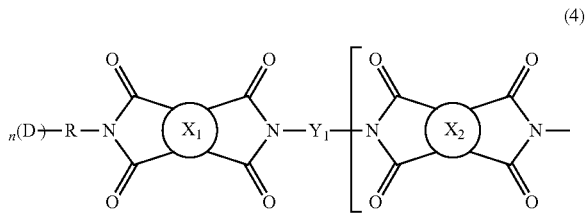

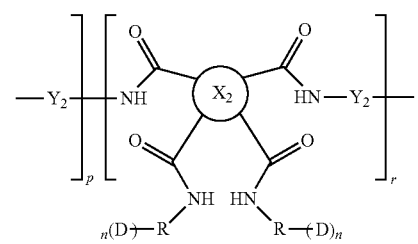

(4)

-continued

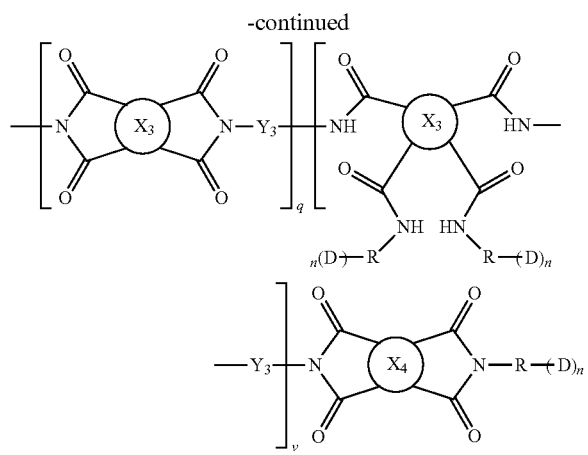

wherein $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, p, q, r, and v are each independently an integer of 0 or greater, with the proviso that p, q, r, and v are not simultaneously 0, and D, R, and n are as defined in Formula 1.

2. The modified polyimide according to claim 1, wherein the terminal group of Formula 1 is derived from the reaction of a terminal acid dianhydride group of a polyimide and a compound of Formula 2:

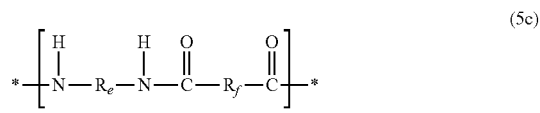

wherein R, D, and n are as defined in Formula 1.

3. The modified polyimide according to claim 1, further comprising, in its main chain, one or more repeating structures represented by Formulae 5a to 5c:

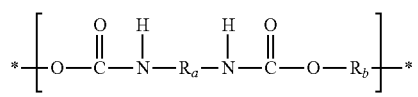

wherein $R_a$ and $R_b$ are each independently selected from the group consisting of aromatic, alicyclic, and aliphatic divalent organic groups,

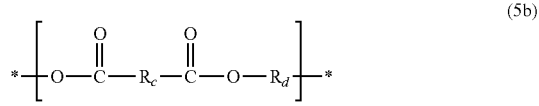

wherein $R_c$ and $R_d$ are each independently selected from the group consisting of aromatic, alicyclic, and aliphatic divalent organic groups, and (5c)

*—[N—H—$R_e$—N—H—C—$R_f$—C]—* wherein $R_e$ and $R_f$ are each independently selected from the group consisting of aromatic, alicyclic, and aliphatic divalent organic groups.

4. The modified polyimide according to claim 1, wherein D in Formula 1 is selected from the group consisting of vinyl, alkyne, acrylate, carboxyl, amide, amino, epoxy, isocyanate, cyano, acid anhydride, mercapto, silanol, alkoxysilane, hydroxyl, oxazoline groups, and combinations thereof.

5. The modified polyimide according to claim 1, wherein D in Formula 1 is selected from acrylate, epoxy, isocyanate, mercapto groups, and combinations thereof.

6. The modified polyimide according to claim 1, wherein in Formula 4, $X_1$, $X_2$, $X_3$, and $X_4$ are each independently a tetravalent organic group derived from an aromatic tetracarboxylic dianhydride and $Y_1$, $Y_2$, and $Y_3$ are each independently a divalent organic group derived from an aromatic diamine.

7. The modified polyimide according to claim 1, wherein the modified polyimide of Formula 4 is prepared by reacting a polyimide compound represented by Formula 3:

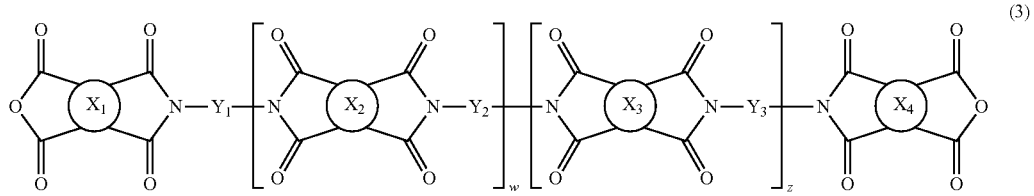

wherein $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, and w and z are each independently an integer of 1 or greater, with an isocyanate compound represented by Formula 2:

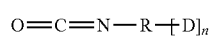

wherein D, R, and n are as defined in Formula 1.

8. The modified polyimide according to claim 1, wherein modified polyimide has a number average molecular weight of 500 to 80,000 g/mol.

9. The modified polyimide according to claim 1, wherein in Formula 4, the sum of p+q+r+v is an integer from 5 to 100.

10. The modified polyimide according to claim 1, wherein the ratio of the weight average molecular weight to the number average molecular weight of the modified polyimide is 1 or greater.

11. The modified polyimide according to claim 2, wherein the compound of Formula 2 is a compound represented by Formula 2a:

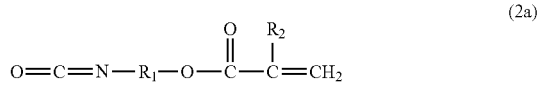

wherein $R_1$ is a $C_1$-$C_{18}$ alkylene group, a $C_6$-$C_{24}$ arylene group or a divalent organic group interrupted by at least one ether, ester, urethane or amide bond as a linker, and $R_2$ is a hydrogen atom or a $C_1$-$C_{18}$ alkyl group.

12. The modified polyimide according to claim 7, wherein the polyimide of Formula 3 is prepared by reacting a tetracarboxylic dianhydride with a diamine in a molar ratio of 1:1 to 1.8:1.

13. A curable resin composition comprising the modified polyimide according to claim 1, a thermal polymerization or photopolymerization initiator, and a solvent.

14. The curable resin composition according to claim 13, wherein the solvent is selected from N,N-diethylacetamide (DEAc), N,N-diethylformamide (DEF), N-ethylpyrrolidone, and mixtures thereof.

15. The curable resin composition according to claim 13, further comprising a polymerizable compound having an ethylenically unsaturated bond, a urethane (meth)acrylate compound or a mixture thereof.

16. A polyimide film obtained by curing the curable resin composition according to claim 13.

17. The polyimide film according to claim 16, wherein the polyimide film has a yellowness index (YI) of 7 or less, as measured at a thickness of 10 μm or more.

18. A method for preparing a modified polyimide having terminal curable functional groups, represented by Formula 4:

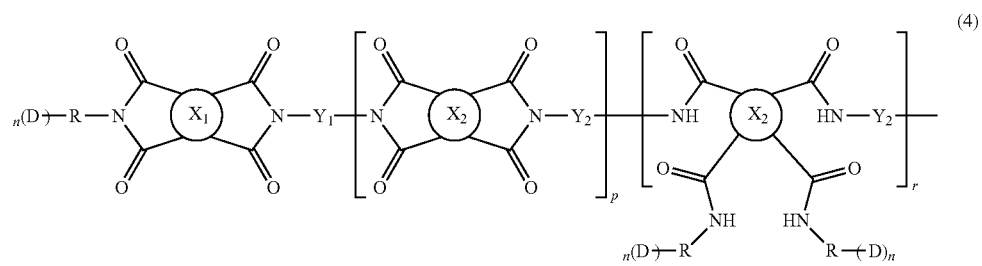

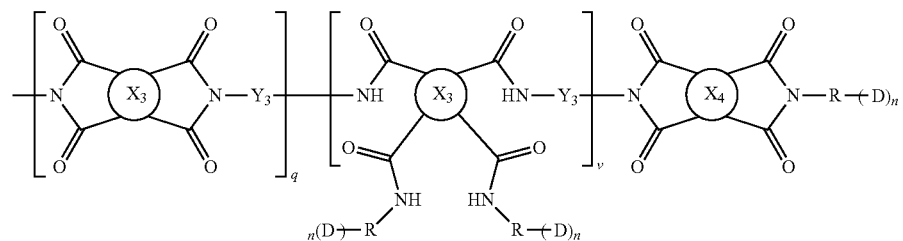

wherein $X_1$, $X_2$, $X_3$, and $X_4$ are each independently a tetravalent organic group derived from a tetracarboxylic dianhydride, $Y_1$, $Y_2$, and $Y_3$ are each independently a divalent organic group derived from a diamine, p, q, r, and v are each independently an integer of 0 or greater, with the proviso that p, q, r, and v are not simultaneously 0, D is a heat curable or photocurable functional group, R is a divalent or higher polyvalent organic group, and n is an integer of 1 or greater, the method comprising reacting a tetracarboxylic dianhydride with a diamine in a polymerization solvent to prepare a polyamic acid, imidizing the polyamic acid to prepare a polyimide having terminal acid dianhydride groups, represented by Formula 3:

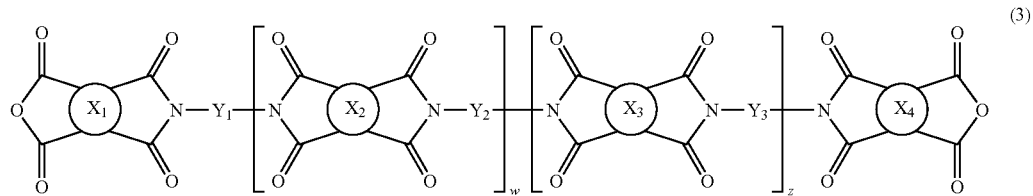

(3)

wherein $X_1$, $X_2$, $X_3$, $X_4$, $Y_1$, $Y_2$, and $Y_3$ are as defined in Formula 4 and w and z are each independently an integer of 1 or greater, and reacting the polyimide of Formula 3 with a compound represented by Formula 2:

(2)

wherein D, R, and n are as defined in Formula 4.

19. The method according to claim 18, wherein the polymerization solvent is selected from N,N-diethylacetamide (DEAc), N,N-diethylformamide (DEF), N-ethylpyrrolidone, and mixtures thereof.

* * * * *